No. 725,389. PATENTED APR. 14, 1903.
E. S. WOODS.
ROLLER SIDE BEARING FOR CAR TRUCKS.
APPLICATION FILED SEPT. 2, 1902.

NO MODEL. 2 SHEETS—SHEET 1.

Witnesses:-
Carl H. Crawford
William L. Hall

Inventor:-
Edwin S. Woods
by Poole & Brown
his Attorneys

No. 725,389. PATENTED APR. 14, 1903.
E. S. WOODS.
ROLLER SIDE BEARING FOR CAR TRUCKS.
APPLICATION FILED SEPT. 2, 1902.
NO MODEL. 2 SHEETS—SHEET 2.

Witnesses:
Carl H. Crawford
William H. Hall

Inventor:
Edwin S. Woods
by Poole + Brown
his Attorneys

UNITED STATES PATENT OFFICE.

EDWIN S. WOODS, OF CHICAGO, ILLINOIS, ASSIGNOR OF ONE-HALF TO SAMUEL WORTHINGTON McMUNN, OF CHICAGO, ILLINOIS.

ROLLER SIDE BEARING FOR CAR-TRUCKS.

SPECIFICATION forming part of Letters Patent No. 725,389, dated April 14, 1903.

Application filed September 2, 1902. Serial No. 121,717. (No model.)

*To all whom it may concern:*

Be it known that I, EDWIN S. WOODS, of Chicago, in the county of Cook and State of Illinois, have invented certain new and useful Improvements in Roller Side Bearings for Car-Trucks; and I do hereby declare that the following is a full, clear, and exact description thereof, reference being had to the accompanying drawings, and to the letters of reference marked thereon, which form a part of this specification.

This invention relates to improvements in roller side bearings for railway-cars; and the invention consists in the matters hereinafter set forth, and more particularly pointed out in the appended claims.

Figure 1:
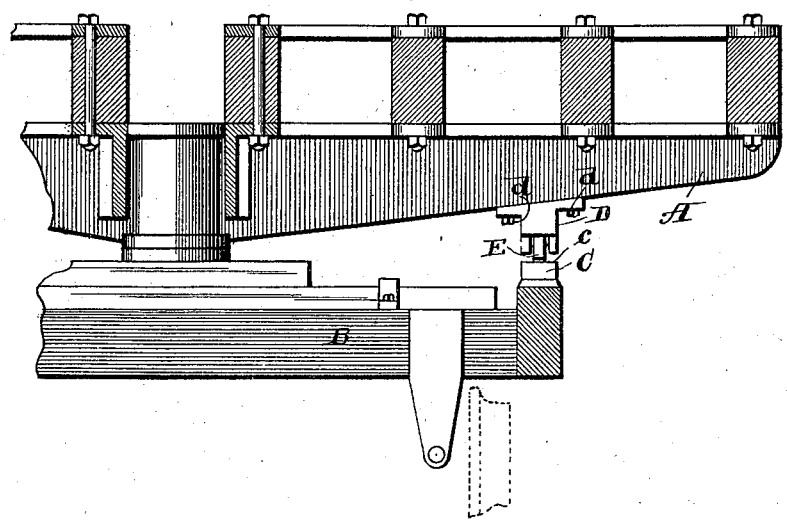
Figure 2:
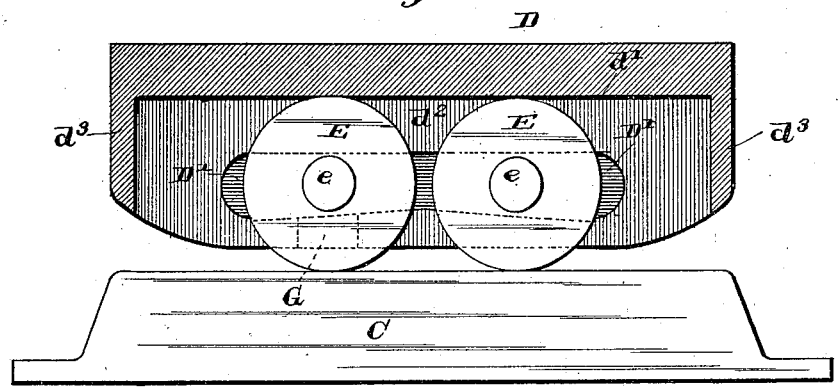
Figure 3:
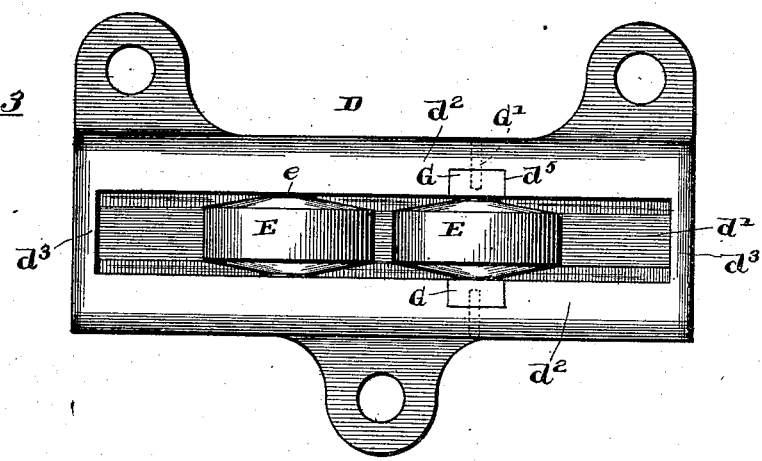
Figure 4:
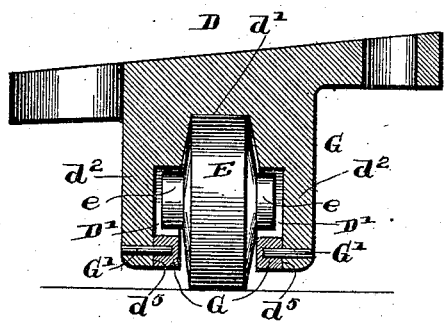
Figure 5:
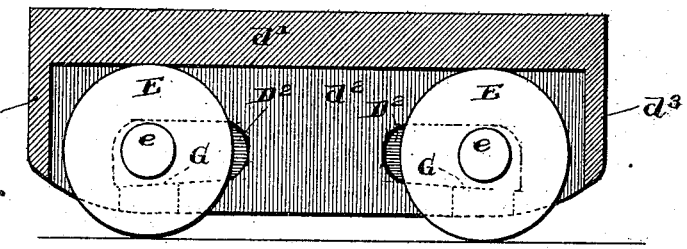

In the drawings, Figure 1 illustrates the application of my improved bearings to the car and truck bolsters of a railway-car. Fig. 2 is a view, partly in longitudinal vertical section and partly in side elevation, of one of the bearings. Fig. 3 is a bottom plan view of the upper bearing member. Fig. 4 is a transverse section thereof. Fig. 5 is a longitudinal vertical section of a modified form of the upper bearing member.

As shown in said drawings, Figs. 1 to 4, inclusive, A represents a portion of a body-bolster of a car, and B the corresponding part of the truck.

C designates a bearing member which is secured in any suitable manner to the upper face of the truck-bolster B and is provided with an upwardly-facing horizontal bearing-surface $c$.

D designates as a whole a bearing member which is secured by bolts $d$ or other suitable means to the under side of the body-bolster in vertical alinement with the bearing-casting C when the car is on straight track. The member D is provided with a downwardly-facing horizontal bearing-surface $d'$, which is normally parallel with the upwardly-facing bearing-surface of the bottom plate or casting. Said upper bearing plate or casting D is provided with side parts or flanges $d^2$, and said flanges or parts $d^2$ are preferably connected by end flanges $d^3$.

E E designate two rollers which are journaled in said upper member D, with their axes horizontal and normally perpendicular to the planes of the flanges $d^2$. The rollers project from the lower open side of the member or casing D for contact with the lower bearing member C. The said rollers E E are provided with trunnions $e$, which engage parallel generally horizontal channels or ways $D'$, formed in the inner surfaces of the side flanges $d^2$ of the upper bearing member. Said channels are of sufficient depth to give clearance beyond the ends of trunnions $e$ and of a width greater than the diameters of the trunnions. The radii of the rollers and the distance between the center lines of the channels $D'$ and the bearing-surface $d'$ of the upper bearing member are so proportioned that when the peripheries of the rollers are in contact with the upper and lower bearing-surfaces the trunnions are out of contact with or free from both the upper and lower walls of the channels $D'$, so that at this time weight from the car is transmitted to the bearing member C directly through the larger parts of the rollers and without bringing stress upon the trunnions $e$ of said rollers.

The lower wall of each channel for the trunnions is inclined from the center toward the ends thereof, so that when the rollers are free from the bearing-surfaces of the upper and lower members D and C, respectively, and the trunnions therefore engage and are supported upon said lower inclined walls of said channels, and said rollers tend by gravity to seek the outer or lower ends of the channels. Owing to the fact that the rollers have peripheral engagement at their larger diameter with the bearing-surfaces when load is transmitted from the car to the truck therethrough and to the further fact that the trunnions rest and roll on the inclined surfaces of the channels when the roller-peripheries are free from the bearing-surfaces, it is assured that the successive points of contact of the rollers with the bearing-surfaces after each release of the rollers are new points of contact. In this manner uniformity of wear of the rollers is insured, and said rollers are prevented from becoming flattened by excessive wear upon certain parts only of their peripheries.

In the application of said bearings to a two-truck car one bearing is located on each side of each truck, thereby providing in connection with the center plates of the car six bearing-points between the car-bolster and the truck when the rollers are in contact with their bearing-surfaces. In assembling said bearings on a car the rollers may be originally set in contact with the upper and lower bearing members C and D, so that the weight of the car when traveling on straight track is supported on said rollers and the center plates. When a car thus equipped strikes a curve, the rollers of diagonally opposite bearings of the car are released by reason of a slight separation of the upper and lower bearing members in contact with which they roll, thereby permitting the rollers to drop, with their trunnions engaging the lower inclined walls of the channels, so that the rollers travel by gravity to the lower ends of the channels and remain there so long as the upper and lower bearing members remain out of contact with the peripheries of the rollers. When the car commences to leave the curve and strikes tangent track, the upper and lower bearing-surfaces again engage the peripheries of the rollers and return said rollers to or near their original positions, and the rollers remain engaged with the upper and lower bearing-surfaces until the car again strikes a curve in the track or the bearing-surfaces are otherwise separated sufficiently to release the rollers.

It will be obvious that the rollers may be set out of contact with the upper and lower bearing-surfaces and ride free therefrom so long as the car is on straight track, and in this event the bearing-surfaces will be brought into contact with the rollers when the car or trucks are tilted, as in passing around a curve or when the car sways from side to side.

Said channels D' are of such length as to arrest the travel of the rollers along the bearing-surfaces of the members C and D before the peripheral surfaces of the rollers are brought into contact with the end flanges of the upper member, the end surfaces of the channels thus constituting stops which arrest the travel of the rollers bodily toward said end flanges. This construction prevents frictional contact between the peripheries of the rollers with the end flanges of said member when said end flanges are employed, which latter contact would obviously result in greater impediment to the rotation of the rollers than would be caused by the frictional contact between the trunnions and the end surfaces of the channels. As a means of permitting the entrance of said roller-trunnions to the channels D' the side flanges of the upper member D are provided with upwardly-opening notches or grooves, which intersect the channels D' and are made practically of the same depth as the channels. When the rollers are being inserted in place, the trunnions thereof pass through said vertical notches. The rollers are prevented from accidentally dropping outwardly from said channels by means of suitable stop-blocks G, which are seated in said notches and are held therein by means of suitable pins G' extending through the blocks and the flanges in the manner shown in Figs. 3 and 4.

In Fig. 5 I have shown a modified arrangement of the rollers with respect to the upper bearing member. In said figure each side flange $d^2$ of the upper member is provided with two separate channels $D^2$ for the trunnions of the rollers E, and each channel is occupied by but one roller-trunnion. Furthermore, the lower walls of the channels incline continuously downwardly from the inner ends to the outer ends of the channels, so that when the rollers are released from the upper and lower bearing-surfaces they seek the lower parts of the channels. The channels of each flange are separated such a distance that when the trunnions of the rollers occupy the inner or adjacent ends of the channels the peripheries of the rollers are not in contact with each other and the adjacent ends of the channels coact with the trunnions to constitute stops to arrest the movement of said rollers. The operation of said modified construction is essentially the same as the form hereinbefore described.

I do not wish to be limited to the specific structural details shown, except as hereinafter made the subject of specific claims. For instance, the ways for the roller-trunnions need not be true channels so long as the essential features of said ways set forth in the claims are preserved.

I claim as my invention—

1. A side bearing for railway-cars comprising upper and lower bearing members having normally parallel bearing-surfaces, a roller adapted for rolling contact with said bearing-surfaces, the upper member having said parts provided with channels, and the roller being provided with trunnions which occupy said channels, the lower walls of each of said channels being inclined toward one end of the member and said trunnions being out of contact with the lower walls of the channels when the roller has peripheral contact with the upper and lower bearing-surfaces and resting and rolling on said lower inclined walls of the channels when said upper and lower bearing-surfaces are out of engagement with the roller.

2. A side bearing for railway-cars comprising upper and lower bearing members having normally parallel bearing-surfaces, rollers adapted for rolling contact with said bearing-surfaces, the upper bearing member having side parts provided with channels, and said rollers being provided with trunnions which occupy said channels, the lower walls of each of the channels being inclined from the center of the member toward the end thereof and said trunnions being out of contact with the lower walls of the channels when the rollers have peripheral engagement with the upper and lower bearing-surfaces, and engaging the inclined walls of the channels when said upper and lower bearing-surfaces are out of engagement with the rollers.

3. A side bearing for railway-cars comprising upper and lower bearing members having normally parallel bearing-surfaces, a roller adapted for rolling contact with said bearing-surfaces, the upper member having said parts provided with channels, and the rollers being provided with trunnions which occupy said channels, the lower walls of each of said channels being inclined toward one end of the member and said trunnions being out of contact with the lower walls of the channels when the roller has peripheral contact with the upper and lower bearing-surfaces and resting and rolling on said lower inclined walls of the channels when said upper and lower bearing-surfaces are out of engagement with the roller, the ends of said channels or ways constituting stops which engage the roller-trunnions to arrest the bodily movement of the roller with respect to said bearing-surfaces.

In testimony that I claim the foregoing as my invention I affix my signature, in presence of two witnesses, this 19th day of August, A. D. 1902.

EDWIN S. WOODS.

Witnesses:
WILLIAM L. HALL,
GEORGE R. WILKINS.